(12) United States Patent
Tutzer

(10) Patent No.: US 10,336,373 B2
(45) Date of Patent: Jul. 2, 2019

(54) LATERAL ENERGY ABSORPTION SYSTEM

(71) Applicant: Thunder Power New Energy Vehicle Development Company Limited, Central (HK)

(72) Inventor: Peter Tutzer, Milan (IT)

(73) Assignee: Thunder Power New Energy Vehicle Development Company Limited, Central (HK)

( * ) Notice: Subject to any disclaimer, the term of this patent is extended or adjusted under 35 U.S.C. 154(b) by 0 days.

(21) Appl. No.: 15/685,376

(22) Filed: Aug. 24, 2017

(65) Prior Publication Data

US 2018/0065678 A1     Mar. 8, 2018

Related U.S. Application Data

(60) Provisional application No. 62/384,298, filed on Sep. 7, 2016.

(51) Int. Cl.
| | | |
|---|---|---|
| *B62D 25/00* | (2006.01) | |
| *B62D 21/15* | (2006.01) | |
| *B62D 21/03* | (2006.01) | |
| *B62D 25/02* | (2006.01) | |
| *B62D 25/20* | (2006.01) | |
| *B62D 29/04* | (2006.01) | |
| *F16F 7/12* | (2006.01) | |

(52) U.S. Cl.
CPC ........... *B62D 21/157* (2013.01); *B62D 21/03* (2013.01); *B62D 25/025* (2013.01); *B62D 25/2036* (2013.01); *B62D 29/041* (2013.01); *B62D 29/043* (2013.01); *F16F 7/122* (2013.01); *F16F 2224/0241* (2013.01)

(58) Field of Classification Search
CPC ........... F16F 7/121; B60R 19/03; B60R 19/34
USPC ................. 267/136, 151–153; 188/371–378; 293/120; 296/187.01–187.03, 193.07, 296/203.01
See application file for complete search history.

(56) References Cited

U.S. PATENT DOCUMENTS

| | | |
|---|---|---|
| 7,874,611 B2 | 1/2011 | Wani et al. |
| 8,336,933 B2 | 12/2012 | Nagwanshi et al. |
| 8,366,185 B2 | 2/2013 | Herntier |

(Continued)

FOREIGN PATENT DOCUMENTS

| | | |
|---|---|---|
| EP | 2 860 086 A1 | 4/2015 |
| WO | 00/30916 A1 | 6/2000 |
| WO | 2015/129110 A1 | 9/2015 |

OTHER PUBLICATIONS

European Search Report for EP 17189833 dated Dec. 21, 2017, all pages.

(Continued)

*Primary Examiner* — Christopher P Schwartz
(74) *Attorney, Agent, or Firm* — Kilpatrick Townsend & Stockton LLP

(57) ABSTRACT

A lateral energy absorption system includes a first carbon structure. The first carbon structure includes a first plurality of carbon tubes. The first plurality of carbon tubes have a first end with a first width and a second end with a second width. The first plurality of carbon tubes define a first taper between the second end and the first end that facilitates crumpling of the first plurality of carbon tubes during an impact. A first plurality of carbon flanges connects the carbon tubes together.

18 Claims, 4 Drawing Sheets

(56) References Cited

U.S. PATENT DOCUMENTS

| | | | |
|---|---|---|---|
| 8,474,583 B2* | 7/2013 | Nagwanshi | B60R 19/34 |
| | | | 188/371 |
| 8,608,232 B2 | 12/2013 | Engertsberger et al. | |
| 8,905,206 B2* | 12/2014 | Zannier | B60R 19/03 |
| | | | 188/371 |
| 2002/0043747 A1* | 4/2002 | Vismara | F16F 7/121 |
| | | | 267/136 |
| 2002/0060462 A1* | 5/2002 | Glance | B32B 3/12 |
| | | | 293/120 |
| 2006/0005503 A1* | 1/2006 | Bladow | B62D 21/15 |
| | | | 156/130.7 |
| 2008/0098601 A1* | 5/2008 | Heinz | B21D 39/20 |
| | | | 29/897.2 |
| 2012/0153669 A1 | 6/2012 | Nagwanshi et al. | |
| 2012/0261949 A1* | 10/2012 | Tyan | B60R 19/34 |
| | | | 296/187.03 |
| 2013/0088045 A1 | 4/2013 | Charbonneau et al. | |
| 2014/0203592 A1* | 7/2014 | Nagwanshi | B62D 29/004 |
| | | | 296/187.01 |
| 2015/0158532 A1 | 6/2015 | Ayuzawa et al. | |
| 2015/0360733 A1* | 12/2015 | Nagwanshi | B62D 29/004 |
| | | | 180/311 |
| 2017/0072884 A1 | 3/2017 | Zannier | |
| 2017/0073020 A1* | 3/2017 | Ayuzawa | B62D 21/157 |
| 2018/0065677 A1 | 3/2018 | Tutzer | |

OTHER PUBLICATIONS

European Search Report for EP 17189831 dated Dec. 21, 2017, all pages.

U.S. Appl. No. 15/685,328, filed Aug. 24, 2017, Non-Final Rejection dated Oct. 6, 2017, all pages.

Advisory Action dated Apr. 6, 2018 in the corresponding U.S. Appl No. 15/685,328.

U.S. Appl. No. 15/685,328, filed Aug. 24, 2017, Final Rejection dated Feb. 9, 2018, all pages.

* cited by examiner

LATERAL ENERGY ABSORPTION SYSTEM

CROSS-REFERENCE TO RELATED APPLICATION

The present application is a nonprovisional of and claims priority to U.S. Provisional Application No. 62/384,298, filed Sep. 7, 2016, the entire contents of which are hereby incorporated by reference for all purposes.

FIELD OF THE INVENTION

The disclosure generally relates to an energy absorption system for a vehicle.

BACKGROUND OF THE INVENTION

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Typical passenger vehicles (e.g., cars, trucks) weigh approximately 3,000 to 4,500 pounds, while commercial vehicles (e.g., buses, semi-trucks) can weigh up to 80,000 pounds. Depending on where these vehicle are driven, they can reach speeds in excess of 75 mph. The resulting vehicle momentum is therefore significant and can create significant damage in an accident. To protect vehicle occupants, these vehicles incorporate a variety of safety features including seatbelts, airbags, anti-lock brakes, etc. Many if not all of these safety features are on electric vehicles as well, but electric vehicles are not powered in the same way that traditional vehicles are. Instead of an internal combustion engine, electric vehicles operate using electric power stored in one or more batteries on the electric vehicle. During operation, the stored electrical energy is controllably released to drive an electric motor. The electric motor converts the electrical energy into mechanical energy, which propels the vehicle. Accordingly, the electric vehicle protects the battery as well as the vehicle occupants in a collision.

SUMMARY OF THE INVENTION

The embodiments discussed below include a vehicle with a lateral energy absorption system. The lateral energy absorption system may include side beams and lightweight energy absorbing carbon structures. In some embodiments, the carbon structures may be placed within the side beams. In operation the side beams and/or carbon structures may be arranged and/or include various features that enable progressive energy absorption during an impact (e.g., a crumple zone). In some embodiments, the carbon structure may include carbon tubes coupled together with flanges. These carbon tubes and flanges may be made out of carbon sheets laid on top of one another in a resin that binds the carbon sheets together into a composite material that is lightweight and capable of absorbing significant amounts of energy.

BRIEF DESCRIPTION OF THE DRAWINGS

Various features, aspects, and advantages of the present invention will be better understood when the following detailed description is read with reference to the accompanying figures in which like characters represent like parts throughout the figures, wherein.

DETAILED DESCRIPTION

One or more specific embodiments of the present invention will be described below. These embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
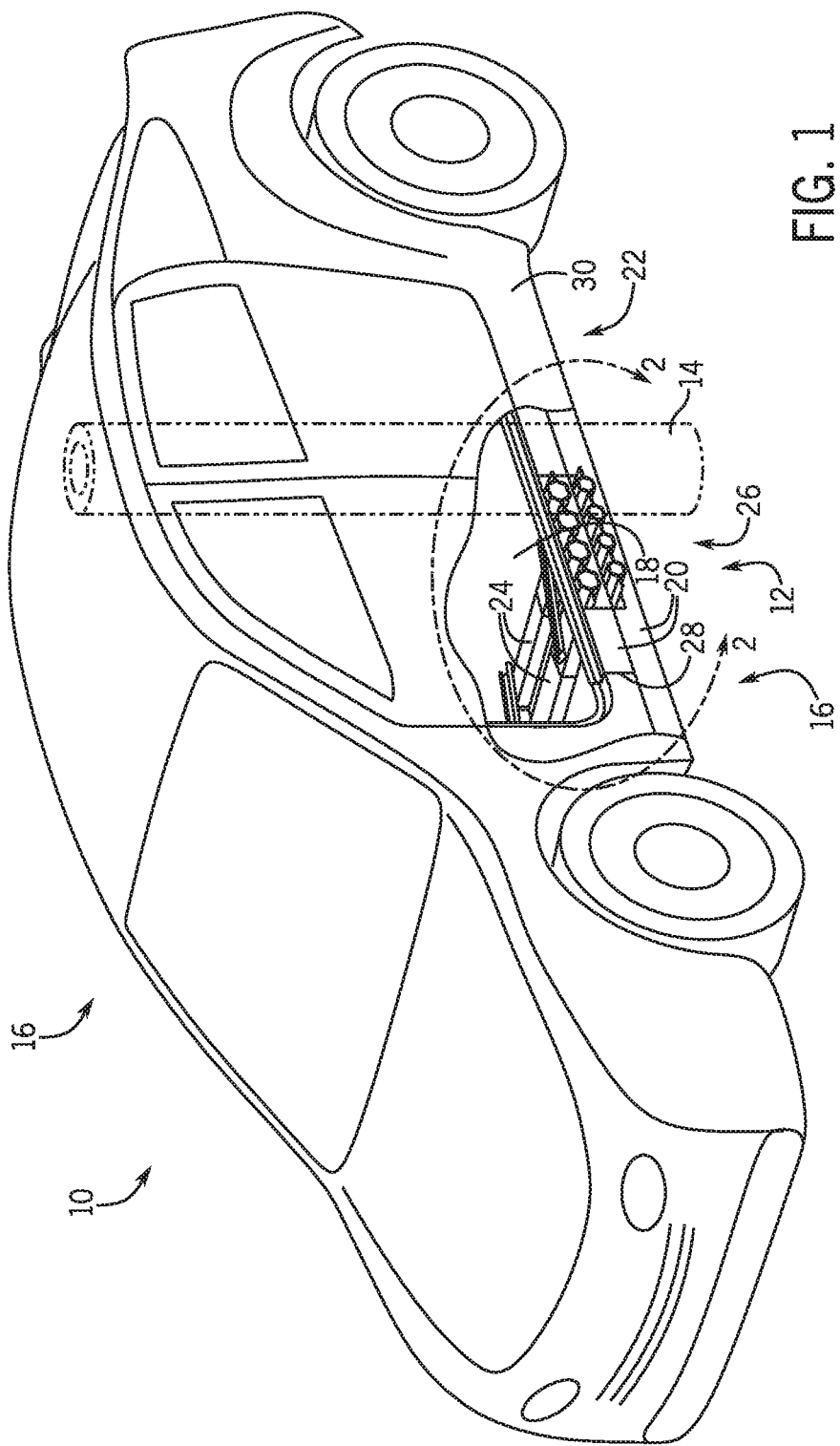
FIG. 1 is a perspective view of an embodiment of a vehicle with a lateral energy absorption system.

FIG. 1 is a perspective view of an embodiment of a vehicle 10 with a lateral energy absorption system 12. In operation, the lateral energy absorption system 12 is designed to absorb a side impact on the vehicle 10. During development vehicles are put through small overlap tests that measure a vehicle's ability to absorb a side impact when a small portion of the car's structure impacts an object such as a pole 14 or tree. These kinds of tests and their real life counterpart crashes can be demanding on, for example, vehicle 10 because the sides 16 of the vehicle 10 are thin compared to other portions of the vehicle 10 (e.g., front) and therefore a significant amount of energy needs to be absorbed in a small space to block or reduce injury to vehicle occupants, and in the case of an electric vehicle protection of the battery. While the discussion below repeatedly refers to electric vehicles, the term electric vehicle does not limit the applicability of the lateral energy absorption system 12. Indeed, the lateral energy absorption system 12 may be applicable to non-electric vehicles or hybrids as well. Furthermore, the term electric vehicle or vehicle is understood to include a variety of electric or non-electric vehicles (e.g., trucks, cars, buses).

The lateral energy absorption system 12 includes one or more side beams 20 position at or near a bottom 22 of the vehicle sides 16. These side beams 20 may be referred to colloquially as the "sill" or "pontoons." The one or more of the side beams 20 may couple to crossbeams 24 that extend through the vehicle 10 and couple to one or more opposing side beams 20 on the opposite side 16 of the vehicle 10. The side beams 20 may be made out of aluminum and/or steel. For example one of the side beams 20 may be made out of steel and the other out of aluminum. In another embodiment, both side beams 20 may be made out of steel or aluminum.

These side beams 20 form a housing that receives one or more energy absorbing carbon structures 26. For example, each of the side beams 20 may receive one or more carbon structures 26. The carbon structures 26 may extend along an entire length of the side beams 20 from a first end 28, proximate a front end of the vehicle 10, to a second end 30 proximate a rear end of the vehicle 10. In another embodiment, the carbon structures 26 may extend over a portion of the side beams 20 (e.g., 10%, 25%, 25%, 50% of the side beam length). For example, the carbon structures 26 may positioned in the side beams 20 at points where stress concentrations may be maximized during an impact (e.g., center of the side beams 20). The carbon structures 26 may also be placed where an impact could cause the greatest amount of damage to a passenger and/or battery (e.g., along the side of the car seat). As will be explained in detail below, the carbon structures 26 cushion impacts by absorbing energy similar to a crumple zone designed into the front of some vehicles. In other words, the carbon structures 26 absorb energy through controlled deformation during an impact. These carbon structures 26 may therefore better protect the vehicle occupants by reducing acceleration and/or deceleration of the vehicle occupants as well as blocking or reducing penetration of the vehicle 10 during a collision.

Figure 2:
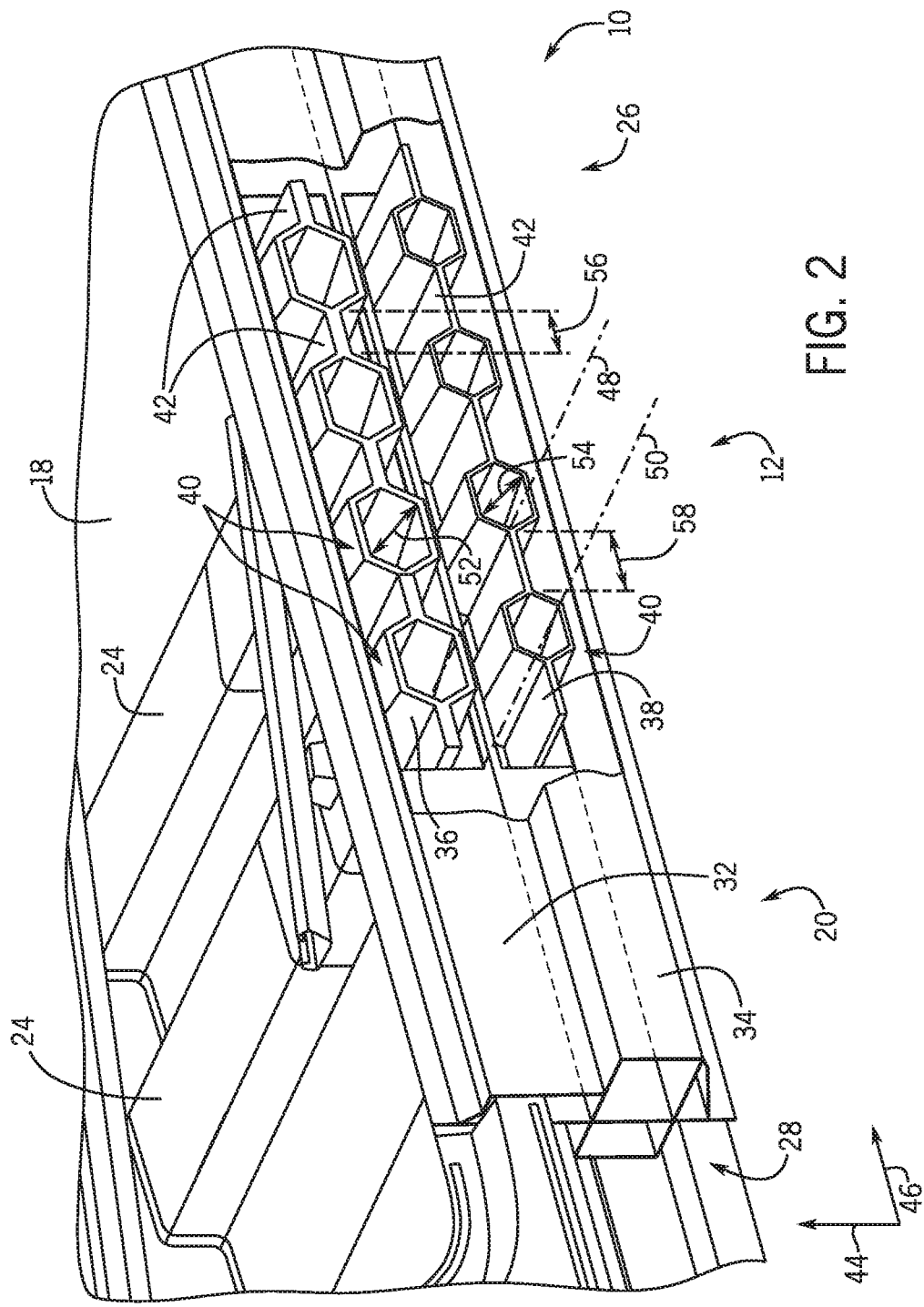
FIG. 2 is a partial perspective view of an embodiment of a vehicle with a lateral energy absorption system.

FIG. 2 is a perspective view of an embodiment of a vehicle 10 with a lateral energy absorption system 12. As explained above, the lateral energy absorption system 12 includes side beams 20 (e.g., upper side beam 32, lower side beam 34) that house one or more energy absorbing carbon structures 26 (e.g., upper carbon structure 36, lower carbon structure 38). The carbon structure 26 may include one or more tubes 40 coupled together with one or more carbon flanges 42. As illustrated, the tubes 40 may form a hexagonal shape, which may be more efficient than other shapes at absorbing energy during a collision. However, other tube shapes are possible. These shapes may include circular, square, rectangular, pentagonal, heptagonal, octagonal, etc.

To increase the ability of the lateral energy absorption system 12 to absorb energy during an impact, the upper and lower beams 32, 34 may include separate carbon structures 26 that are vertically offset from each other in direction 44, but aligned in with one another in direction 46. In some embodiments the energy absorption ability of the lateral energy absorption system 12 may be further increased by substantially aligning the central axes 48 and 50 of the upper and lower carbon structures 36, 38.

As explained above, the carbon structures 26 include tubes 40 coupled together with flanges 42. This shape may be manufactured by forming two halves that are then later combined together (e.g., a top half and a bottom half). Each half may contain half of the tubes 40 and half the thickness of the flanges 42. These halves may be formed by layering carbon sheets on top of one another in a resin (e.g., composite material).

In some embodiments, the tubes 40 of the upper carbon structure 36 may differ from the tubes 40 of the lower carbon structure 38, and the flanges 42 of the upper carbon structure 36 may differ from the flanges 42 of the lower carbon structure 38. In another embodiment, the tubes 40 of both the upper and lower carbon structures 36, 38 may have diameters 52, 54 that are equal. The flanges of the upper and lower carbon structures 36, 38 may also differ with respect to each other. For example, the length 56 of the flanges 42 on the upper carbon structure 36 may be less than the lengths 58 of flanges 42 on the lower carbon structure 38. The thicknesses of the carbon material (e.g., tubes 40 and/or flanges 42) may also differ between the upper and lower carbon structures 36, 38.

In addition to differences between the upper and lower carbon structures 36, 38, the diameters of the tubes 40 and lengths of the flanges 42 on the respective upper and/or lower carbon structures 36, 38 may differ with respect to each other. For example, one or more of the tubes 40 on the upper carbon structure 36 may have a diameter greater than or less than one or more other tubes 40 on the upper carbon structure 36. The tubes 40 on the upper structure and/or lower carbon structure 36, 38 may also differ in shape with respect to each other. For example, one or more tubes 40 may be hexagonal in shape while one or more other tubes 40 may have a different shape (e.g., circular, square, rectangular, heptagonal, octagonal, etc.). Likewise, the flanges 42 may differ in length and/or width on the upper and/or lower carbon structures 36, 38 with respect to one or more other flanges 42 on either the upper and/or lower carbon structures 36, 38. The differences in tube shape, diameter size, flange length, widths, etc. may enable customization of the upper and lower carbon structures 36, 38 to account for different types and locations of impacts.

Figure 3:
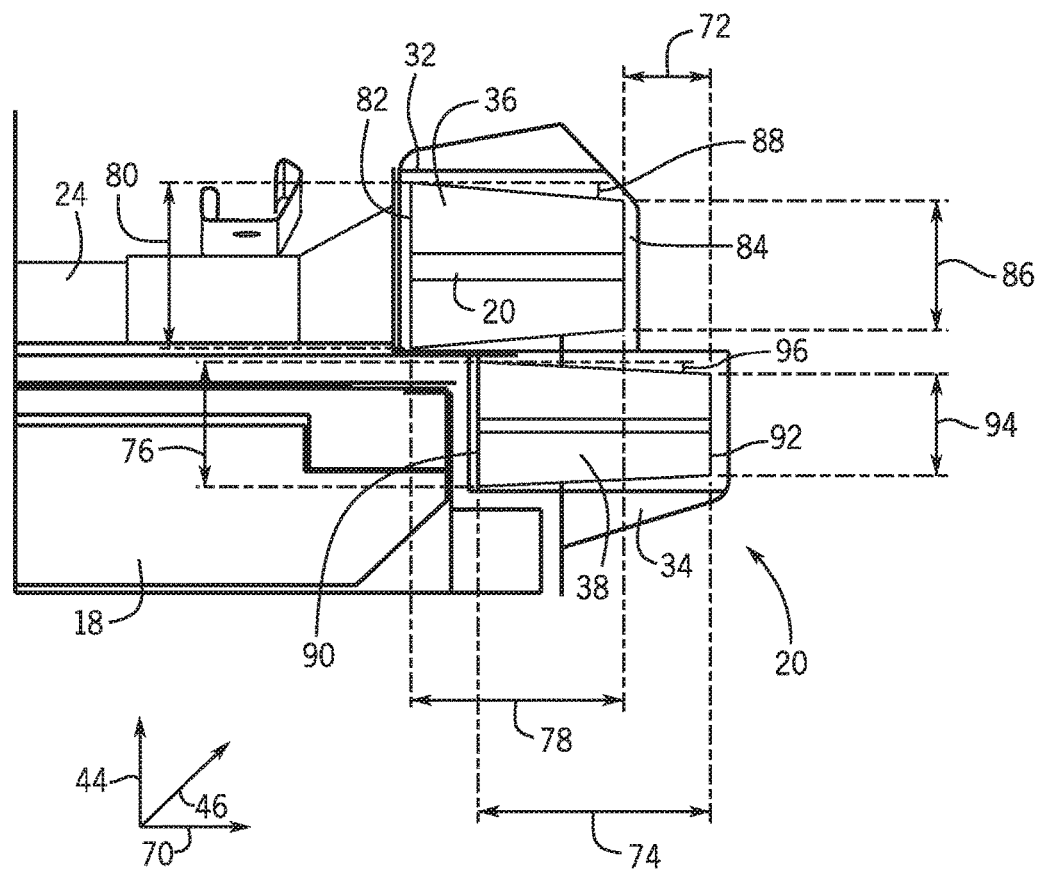
FIG. 3 is a partial cross-sectional view of an embodiment of a lateral energy absorption system.

FIG. 3 is a partial cross-sectional view of an embodiment of a lateral energy absorption system 12. As illustrated, the carbon structures 26 rest within side beams 20 and as explained above the carbon structures 26 and side beams 20 are offset from each other in direction 44. For example, they may be stacked on top of each other. The carbon structures 26 and side beams 20 may also be laterally offset from each other in direction 70. In this configuration, the lateral energy absorption system 12 enables the lower carbon structure 38 and lower side beam 34 to begin absorbing a side impact before the upper carbon structure 36 and upper side beam 32. In other words, the upper and lower carbon structures 36, 38 and side beams 32, 34 may operate as a crumple zone, with the lower carbon structure 38 and the lower side beam 34 absorbing energy and crumpling before the upper carbon structure 36 and upper side beam 32. The upper and lower carbon structures 36, 38 and side beams 32, 34 may be offset from each other a distance 72. The offset distance 72 may depend on the type of impact and the relative strengths and energy absorbing abilities of the upper and lower carbon structures 36, 38.

In addition to offsetting the upper and lower carbon structures 36, 38, the upper and lower carbon structures 36, 38 may have different energy absorbing properties. For example, the lower carbon structure 38 may define a length 74 and a maximum width 76 while the upper carbon structure 36 may define a length 78 and a maximum width 80. As illustrated, the maximum thickness 76 of the lower carbon structure 38 is less than the maximum thickness 80 of the upper carbon structure 36. This difference may make the lower carbon structure 38 weaker than the upper carbon structure 36. Accordingly, the length 74 of the lower carbon structure 38 may be greater than the length 78 of the upper carbon structure 36 in order for the lower carbon structure 38 to be the first to absorb energy from an impact. Once the lower carbon structure 38 and lower side beam 34 crumple the offset distance 72 the upper carbon structure 36 and upper side beam 32 join the lower carbon structure 38 and lower side beam 34 in absorbing energy from the impact. Supporting the upper carbon structure 36 and upper side beam 32 are crossbeams 24 that extend through the vehicle 10. As illustrated, the crossbeams 24 support the upper carbon structure 36 and upper side beam 32, which accommodates the current position of the battery 18. However, in some embodiments the lateral energy absorption system 12 may include crossbeams 24 that support the lower carbon structure 38 or crossbeams 24 that support a combination of the upper and lower carbon structures 36, 38.

In some embodiments, the positions of the upper and lower carbon structures 36, 38 may switch (e.g., the stronger carbon structure may be positioned below the weaker carbon structure with respect to the direction 44). In still other embodiments, there may be additional carbon structures 26. For example, the lateral energy absorption system 12 may include additional carbon structures and side beams 20 (e.g., 1, 2, 3, 4, 5 or more) that stack above, below, or between the current upper and lower carbon structures 36, 38 and side beams 32, 34. The addition of these carbon structures and side beams 20 may form additional crumple zones during a side impact. Each of these side beams 20 and carbon structures 26 may differ with respect to each other in absorbing energy enabling the lateral energy absorption system 12 to incrementally increase energy absorption during an impact. The gradually absorption of energy may further protect vehicle occupants by reducing acceleration during a collision.

In some embodiments, one or more of the carbon structures may independently form a crumple zone by tapering the carbon structure. As illustrated, the upper carbon structure 36 defines a first end 82 having the maximum or first width 80 and a second end 84 having a second width 86. Between the first and second ends 82 and 84, the upper carbon structure 36 tapers at an angle 88. The angle 88 may vary to facilitate crumpling of the upper carbon structure 36. This taper facilitates progressive energy absorption by the upper carbon structure 36 because the upper carbon structure 36 decreases in strength in direction 70. In other words, during an impact the upper carbon structure 36 may progressively absorb more energy from the second end 84 to the first end 82 (e.g., operate as an independent crumple zone). The greater the angle 88 the faster the upper carbon structure 36 crumples during an impact and correspondingly may reduce acceleration of the vehicle occupants. In contrast decreasing the angle 88 may enable the upper carbon structure 36 to resist crumpling and absorb more energy.

The lower carbon structure 38 may similarly have a taper between a third end 90 and a fourth end 92. As illustrated, the third end 90 has the width 76 and the fourth end 92 has a width 94. Between the third and fourth ends 90 and 92 the lower carbon structure 38 tapers at an angle 96. The angle 96 may vary to facilitate crumpling of the lower carbon structure 38. The greater the angle 96 the faster the lower carbon structure 38 crumples during an impact. In contrast decreasing the angle 96 may enable the lower carbon structure 38 to resist crumpling. This taper facilitates progressive energy absorption by the lower carbon structure 38 from the fourth end 92 to the third end 90. In other words, changing the angles 88 and 96 enables customization of the upper and lower carbon structures 36, 38 to account for different kinds of impacts.

Figure 4:
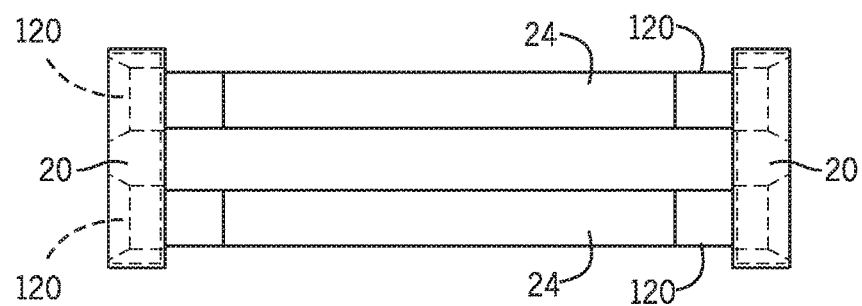
FIG. 4 is a partial top view of a vehicle with a lateral energy absorption system.

FIG. 4 is a partial top view of a vehicle 10 with a lateral energy absorption system 12. As explained above, the lateral energy absorption system includes one or more carbon structures 26 within one or more side beams 20. To provide additional lateral support between sides 16 of the vehicle 10, the lateral energy absorption system 12 may include one or more crossbeams 24 that couple to and extend between side beams 20 on opposite sides of the vehicle 10. For example, the lateral energy absorption system 12 may include 1, 2, 3, 4, 5, or more crossbeams 24 between the side beams 20. The crossbeams 24 may be made out of steel, aluminum, carbon, or a combination thereof. In other words, one or more crossbeams 24 may be made out of steel and one or more crossbeams 24 may be made out of aluminum. In some embodiments, the crossbeams 24 may be completely made out of a carbon (i.e., layers of carbon sheets in a resin) or a steel or aluminum crossbeam 24 may include a carbon structure inside (e.g., similar to the discussion above with respect to the side beams 20). In embodiments where one or more crossbeams 24 is made out of carbon or includes carbon structure inside, the crossbeams 24 may include tapers that facilitate gradually energy absorption. The tapers may start/begin at the center of the crossbeams 24 and gradually taper down until both sides of the crossbeam 24 until they contact the side beams 20. In other embodiments, the tapers may begin at the ends of the crossbeam 24 and taper down towards the center of the cross-beam. As explained above, the gradual absorption of energy by the lateral energy absorption system 12 may reduce the shock of an impact and the associated acceleration of vehicle occupants.

Figure 5:
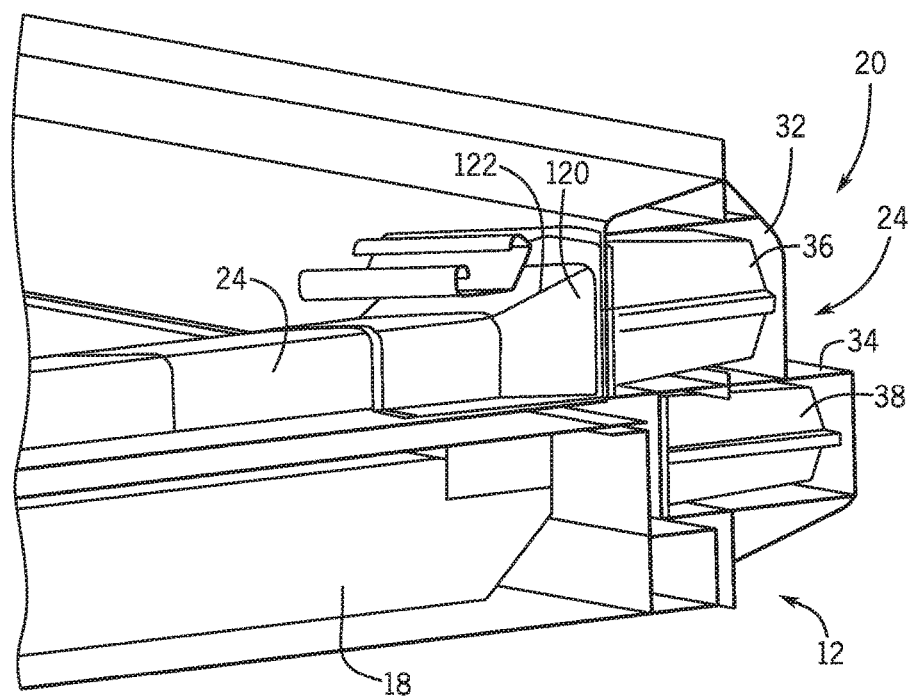
FIG. 5 is a partial perspective view of a vehicle with a lateral energy absorption system.

FIG. 5 is a partial perspective view of a vehicle 10 with a lateral energy absorption system 12. As illustrated, the crossbeam 24 couples to one or both of the side beams 20. In FIG. 5, the side beam 20 couples to the upper side beam 32 to accommodate the battery 18. However, in some embodiments, the crossbeam 24 may couple to the lower side beam 34. In some embodiments, the crossbeams 24 may include enlarged ends 120 that couple to the crossbeam 24 and the side beam 20. As illustrated, the ends 120 have a larger cross-section than the rest of the crossbeam 24 increasing the contact area with the side beam 20. The ends may also form a taper 122. The taper 122 on the crossbeam 24 may form another crumple zone enabling the crossbeam 24 to gradually absorb energy from the side beams 20.

While several embodiments and arrangements of various components are described herein, it should be understood that the various components and/or combination of components described in the various embodiments may be modified, rearranged, changed, adjusted, and the like. For example, the arrangement of components in any of the described embodiments may be adjusted or rearranged and/or the various described components may be employed in any of the embodiments in which they are not currently described or employed. As such, it should be realized that the various embodiments are not limited to the specific arrangement and/or component structures described herein.

In addition, it is to be understood that any workable combination of the features and elements disclosed herein is also considered to be disclosed. Additionally, any time a feature is not discussed with regard in an embodiment in this disclosure, a person of skill in the art is hereby put on notice that some embodiments of the invention may implicitly and specifically exclude such features, thereby providing support for negative claim limitations.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

What is claimed is:
1. A lateral energy absorption system, comprising:
 a first carbon structure, comprising:
  a first plurality of carbon tubes, wherein the first plurality of carbon tubes comprise a first end with a first width and a second end with a second width, the first width being greater than the second with, the first plurality of carbon tubes defines a first taper between the second end and the first end such that between the first and second ends the carbon first structure tapers at an acute angle, wherein the first taper of the carbon tubes facilitates crumpling of the first plurality of carbon tubes during an impact, and the first plurality of carbon tubes include a first carbon tube having hexagonal shape, a second carbon tube having a circular shape, and a third carbon tube having a rectangular shape;

a first plurality of carbon flanges configured to connect the carbon tubes together, wherein the first plurality of flanges have varying lengths; and a second plurality of cross supporting members coupling to and extending between the first plurality of carbon tubes in a direction perpendicular or substantially perpendicular to the first plurality of flanges.

2. The system of claim 1, wherein the first plurality of tubes define a hexagonal shape.

3. The system of claim 1, comprising a second carbon structure, the second carbon structure comprising a second plurality of carbon tubes coupled together with a plurality of second carbon flanges, wherein the second plurality of carbon tubes comprise a third end with a third width and a fourth end with a fourth width.

4. The system of claim 3, wherein the second plurality of carbon tubes define a second taper between the third end and the fourth end, wherein the second taper of the carbon tubes facilitates crumpling of the second plurality of carbon tubes during an impact.

5. The system of claim 3, wherein the second plurality of tubes define a hexagonal shape.

6. The system of claim 3, wherein the first carbon structure and the second carbon structure are vertically and horizontally offset.

7. The system of claim 3, wherein the first carbon structure defines a first length and the second carbon structure defines a second length, and wherein the first length is greater than the second length.

8. The system of claim 3, wherein each carbon tube of the first plurality of carbon tubes define a first axis and each carbon tube of the second plurality of carbon tubes define a second axis, and wherein the first axes of the first plurality of carbon tubes are substantially aligned with the second axes of the second plurality of carbon tubes.

9. The system of claim 3, wherein each carbon tube of the first plurality of carbon tubes define a first diameter and each carbon tube of the second plurality of carbon tubes define a second diameter, and wherein the first diameter is less than the second diameter.

10. The system of claim 3, wherein each carbon flange of the first plurality of carbon flanges define a first length and each carbon flange of the second plurality of carbon flanges define a second length, and wherein the first length is greater than the second length.

11. A lateral energy absorption system, comprising:
a first carbon structure, comprising:
a first plurality of carbon tubes, wherein
the first plurality of carbon tubes comprise a first end with a first width and a second end with a second width, the first width being greater than the second with, the first plurality of carbon tubes defines a first taper between the second end and the first end such that between the first and second ends the carbon first structure tapers at an acute angle, wherein the first taper of the carbon tubes facilitates crumpling of the first plurality of carbon tubes during an impact, and the first plurality of carbon tubes include a first carbon tube having hexagonal shape, a second carbon tube having a circular shape, and a third carbon tube having a rectangular shape;

a first plurality of carbon flanges configured to connect the carbon tubes together, wherein the first plurality of flanges have varying lengths;

a second carbon structure, comprising:
a second plurality of carbon tubes, wherein the second plurality of carbon tubes comprise a second end with a second width and a second end with a second width, and the second plurality of carbon tubes defines a second taper between the second end and the second end, wherein the second taper of the carbon tubes facilitates crumpling of the second plurality of carbon tubes during an impact; and a second plurality of carbon flanges configured to connect the second plurality of carbon tubes together;

the first plurality of carbon tubes include a first carbon tube having hexagonal shape, a second carbon tube having a circular shape, and a third carbon tube having a rectangular shape;

a first plurality of carbon flanges configured to connect the carbon tubes together, wherein the first plurality of flanges have varying lengths; and a third plurality of cross supporting members coupling to and extending between the first plurality and second plurality of carbon tubes in a direction perpendicular or substantially perpendicular to the first plurality and second plurality of flanges.

12. The system of claim 11, wherein the first plurality of tubes define a hexagonal shape.

13. The system of claim 11, wherein the second plurality of tubes define a hexagonal shape.

14. The system of claim 11, wherein the first carbon structure and the second carbon structure are vertically and horizontally offset.

15. The system of claim 11, wherein the first carbon structure defines a first length and the second carbon structure defines a second length, and wherein the first length is greater than the second length.

16. The system of claim 11, wherein each carbon tube of the first plurality of carbon tubes define a first axis and each carbon tube of the second plurality of carbon tubes define a second axis, and wherein the first axes of the first plurality of carbon tubes are substantially aligned with the second axes of the second plurality of carbon tubes.

17. The system of claim 11, wherein each carbon flange of the first plurality of carbon flanges define a first length and each carbon flange of the second plurality of carbon flanges define a second length, and wherein the first length is greater than the second length.

18. The system of claim 11, wherein each carbon tube of the first plurality of carbon tubes define a first diameter and each carbon tube of the second plurality of carbon tubes define a second diameter, and wherein the first diameter is less than the second diameter.

* * * * *